Patented July 28, 1953

2,647,135

UNITED STATES PATENT OFFICE 2,647,135

11-ALPHA-HYDROXY-3,20-DIKETO-PREGNANES

Alan H. Nathan, Kalamazoo, Mich., assignor to The Upjohn Company, Kalamazoo, Mich., a corporation of Michigan No Drawing. Application January 8, 1952, Serial No. 265,527

3 Claims. (Cl. 260—397.4)

The present invention relates to steroid compounds, and is more particularly concerned with 11α-hydroxypregnane-3,20-dione and 11α-hydroxyallopregnane-3,20-dione.

This application is a continuation-in-part of my co-pending application, Serial No. 244,744, filed August 31, 1951, jointly with John A. Hogg and Douglas A. Lyttle.

It is an object of the present invention to provide the novel compounds, 11α-hydroxypregnane-3,20-dione and 11α-hydroxyallopregnane-3,20-dione. Other objects of the invention will be apparent to those skilled in the art to which this invention pertains.

The novel compounds of the present invention have utility as intermediates in the preparation of biologically active compounds such as cortisone, and are also physiologically active per se. 11α-hydroxypregnane-3,20-dione can be easily oxidized to the known pregnane-3,11,20-trione by reaction with chromic acid in acetic acid while 11α-hydroxyallopregnane-3,20-dione can be converted to the known allopregnane 3,11,20-trione under similar treatment. Both of these triones can be converted to cortisone according to known procedures such as, for example, introduction of hydroxyl groups at carbon atoms 17 and 21, and introduction of a double bond at carbon atom 4. The alpha configuration of the hydroxyl group at carbon atom 11 in the compounds of the present invention renders such compounds of special utility. In contrast to compounds having a hydroxyl group at carbon atom 11 in the beta configuration, the compounds of the present invention can easily be esterified. Such esters are useful for the purpose of protecting the hydroxyl group in subsequent chemical reactions, and in addition have utility as intermediates in the production of biologically active compounds with ester groups at carbon atom 11.

In carrying out the process for the production of the compounds of the present invention, 11α-hydroxyprogesterone (prepared from progesterone by a fermentation process as more fully described in Preparation 1) is hydrogenated with hydrogen in the presence of a hydrogenation catalyst such as, for example, 30 per cent palladium-charcoal catalyst. The starting compound is usually dissolved in an organic solvent such as, for example, methanol, ethanol, acetone, benzene, chloroform and the like, with ethanol being preferred, and the catalyst added thereto. If desired, the solution may be kept basic by the addition of a few drops of an amine such as triethylamine to the reaction mixture. Hydrogen is then introduced and the reaction mixture shaken until the theoretical amount of hydrogen has been absorbed. The reaction is generally accomplished at room temperature with about ten pounds of hydrogen pressure. Other temperatures such as, for example, temperatures between about zero and about sixty degrees centigrade are operative. Higher or lower hydrogen pressures may also be utilized if desired. The reduction products may be isolated by any conventional means such as, for example, evaporation of the solvent and crystallization of the residue, chromatography, and the like.

The following examples are illustrative of the products of the present invention, but are not to be construed as limiting.

*Preparation 1.—11α-hydroxyprogesterone*

To four liters of a 32–48 hour growth of culture RH 176 (Rhizopus arrhizus strain) was added one gram of progesterone in fifty milliliters of acetone, providing a suspension of the steroid in the water of the culture. The culture was then incubated at room temperature for 48 hours. At the end of this time the pH of the medium was 3.5 and the fermentation liquor and mycelia were extracted successively with three one-liter portions, one two-liter portion, and one one-liter portion of methylene chloride. The methylene chloride extracts were combined and washed with two 400-milliliter portions of two per cent aqueous sodium bicarbonate solution and three 500-milliliter portions of water. The methylene chloride extract was evaporated to dryness in vacuo and the solids taken up in fifty milliliters of methylene chloride. The solution was transferred to a 100-milliliter beaker and evaporated by a stream of air. The solids, weighing 1.585 grams, were dissolved in five milliliters of hot methanol and allowed to cool slowly at room temperature whereupon 75 milligrams of crystals separated out. The mother liquor was freed of solvent by aeration, dissolved in fifty milliliters of benzene, and chromatographed over alumina $(Al_2O_3)$. Fifty grams of acid-washed alumina, dried at 45 degrees centigrade, was used as adsorbent and 100-milliliter portions of solvents were used to develop the column. The solvents and the order used were as follows: benzene, benzene, benzene plus 5% ether, benzene plus 5% ether, benzene plus 10% ether, benzene plus 10% ether, benzene plus 10% ether, benzene plus 50% ether, benzene plus 50% ether, ether, ether, ether plus 5% chloroform, ether plus 5% chloroform, ether plus 10% chloroform, ether plus 10% chloroform, ether plus 50% chloroform, ether plus 50% chloroform, chloroform, chloroform, chloroform plus 5% acetone, chloroform plus 5% acetone, chloroform plus 10% acetone, chloroform plus 10% acetone, chloroform plus 50% acetone, chloroform plus 50% acetone, acetone, acetone, acetone plus 5% methanol, acetone plus 5% methanol, acetone plus 10% methanol, acetone plus 10% methanol, acetone plus 50% methanol, acetone plus 50% methanol. The chloroform and chloroform plus 5% acetone eluates were combined, evaporated to dryness, and the residue dissolved in two milliliters of hot methanol and filtered. After overnight refrigeration, 171 milligrams of crystalline 11α-hydroxyprogesterone, melting at 166 to 167 degrees centigrade was obtained. A recrystallized sample gave the following constants: melting point, 166 to 167 degrees centigrade; $[\alpha]_D^{20}$ plus 175.9 degrees (chloroform).

*Analysis.*—calculated for $C_{21}H_{30}O_3$: C, 76.4; H, 9.10. Found: C, 76.6; H, 8.92.

The structure of this product was further established by its conversion, with chromic acid in acetic acid, to the known 11-ketoprogesterone [Reichstein, Helv. Chim. Acta. 23, 684 (1940); ibid 26, 721 (1943)].

*Example 1.—11α - hydroxypregnane - 3,20 - dione and 11α-hydroxyallopregnane-3,20-dione*

A solution of 250 milligrams (0.75 millimole) of 11α-hydroxyprogesterone in 100 milliliters of ethanol containing six drops of triethylamine was subjected to hydrogenation at room temperature under a pressure of about ten pounds of hydrogen in the presence of 45 milligrams of a 30% palladium-charcoal catalyst in a Parr apparatus with an auxiliary mercury manometer. The time required for the hydrogenation was about twenty minutes. The reaction mixture was filtered and the solvent was evaporated to yield 265 milligrams of material melting at 145 to 185 degrees centigrade. This product was extracted with a mixture of one milliliter of ether and nine milliliters of Skelly Solve B (petroleum ether, boiling range 60–70 degrees centigrade). On standing, the extract deposited eighty milligrams (32%) of 11α-hydroxypregnane-3,20-dione as feathery needles which melted at about 85 to 90 degrees centigrade. The melting point of the normal form was extremely variable, ranging from about 55 degrees centigrade to about 130 degrees centigrade. The variability in melting point did not affect the utility of the various batches as the same results were obtained when these batches were employed in further operations.

*Analysis.*—Per cent calculated for $C_{21}H_{32}O_3$: C, 75.86; H, 9.70. Found: C, 76.13; H, 9.63.

The residue from the above extraction weighed 146 milligrams and melted at 165 to 185 degrees centigrade. Recrystallization from ethyl acetate gave 85 milligrams (34%) of 11α-hydroxyallopregnane-3,20-dione, melting at 193 to 196 degrees centigrade with softening about 190 degrees. A purified sample melted at 198.5 to 199.5 degrees centigrade.

*Analysis.*—Per cent calculated for $C_{21}H_{32}O_3$: C, 75.86; H, 9.70. Found: C, 75.59; H, 9.98.

The separation of the normal and allo pregnanes was also accomplished by chromatography. An intimate mixture of 16.7 grams of diatomaceous earth (Celite 545) and 8.3 grams of activated carbon (Darco G-60) was wet packed with about 150 milliliters of methanol into a column three centimeters wide. About two pounds of air pressure was applied until the liquid had dropped to the level of the adsorbent. A plug of cotton was packed on the top of the adsorbent and the column was washed with one 200-milliliter fraction of methanol and two 200-milliliter fractions of acetone. The reaction residue from a hydrogenation in methanol (according to the procedure given above) of 500 milligrams of 11α-hydroxyprogesterone was dissolved in 200 milliliters of acetone and added to the column. This fraction, after passing through the column, was termed the first eluate fraction. It was followed by eight 200-milliliter fractions of acetone and four 200-milliliter fractions of methylene chloride. Each new fraction was added when the level of the preceding one reached the cotton plug. Fractions two to six, inclusive, were combined and the solvent was removed by evaporation to yield 11α-hydroxypregnane-3,20-dione. 11α-hydroxyallopregnane-3,20-dione was similarly obtained from fractions ten to twelve, inclusive.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A compound selected from the group consisting of 11α-hydroxypregnane-3,20-dione and 11α-hydroxyallopregnane-3,20-dione.
2. 11α-hydroxypregnane-3,20-dione.
3. 11α-hydroxyallopregnane-3,20-dione.

ALAN H. NATHAN.

No references cited.